Reissued Sept. 17, 1940

Re. 21,566

UNITED STATES PATENT OFFICE 21,566

PROCESS OF CONCENTRATING ORES

Leslie D. Anderson, Carlsbad, N. Mex., assignor to Potash Company of America, a corporation of Colorado No Drawing. Original No. 2,046,312, dated July 7, 1936, Serial No. 748,477, October 16, 1934. Application for reissue January 3, 1937, Serial No. 183,233

7 Claims. (Cl. 209—166)

This invention relates to the concentration of ores and its primary object is to provide a simple and efficacious method of separating valuable constituents of soluble ores, such as sylvinite ore, for example, in a process requiring the intermixture of such an ore with water or other liquid. As an example of such process, reference is had to the well-known flotation process of concentrating ores to which the present invention is particularly adapted.

An essentiality of the flotation process is that the ore in a finely divided condition be suspended in water or other liquid and subjected to agitation and/or aeration in the presence of an agent which has a preferential affinity for the metalliferous constituents of the ore over baser matter, thereby causing the values to rise to the surface of the liquid in a froth which subsequently is removed by overflow.

Obviously, the flotation process as hereinabove described is applicable only to ores which are substantially non-soluble since the values to be entrapped in the froth must necessarily be held in suspension in the liquid, with which the ore is intermixed, in a solid condition, and the present invention as applied to a flotation process of concentrating ore, has for its aim to apply said process to ores whose valuable constituents go into solution when mixed with water or other liquid.

While the invention as hereinafter to be described may be adapted for the concentration of various soluble ores, it is more particularly adapted to the treatment of sylvinite ores, containing potassium salts as their valuable constituents, and it is in this connection that the steps involved in the process according to the present invention, will now be described.

Sylvinite ores, such as those obtained from the Carlsbad, New Mexico deposit have proven particularly amenable to treatment by the present process, and consist mainly of potassium chloride and sodium chloride, together with various amounts of gangues and other potash minerals like polyhalite which become intermixed in the mining operations.

The sodium mineral (halite) is of little market value, except where it can be produced cheaply in a refined condition close to a substantial market, whereas the potassium mineral, such as the sylvite (KCl) and the polyhalite inclusions ($K_2SO_4 \cdot MgSO_4 \cdot 2CaSO_4 \cdot 2H_2O$), may be worked profitably at a distance from the market because of the relatively higher price which it commands. The term valuable constituents as used herein, is therefore intended to designate potash salts as distinguished from sodium salts.

In this specification, the term "sylvinite" is used to designate any ore or mineral containing both potassium chloride and sodium chloride in varying ratios with or without inclusions of other potassium salts.

The sylvinite ore with its soluble matter, is in a finely divided condition, intermixed with a liquid consisting of a saturated solution of the same ore or more essentially of its halite and sylvite constituents, and subjected to the selective action of a flotation agent which in the presence of mechanical agitation and/or aeration, will carry the valuable constituents which remained in a solid state owing to the saturated condition of the liquid, to the surface in a froth to be removed by overflow.

A saponaceous agent is well adapted for the purpose and in the treatment of sylvinite ores, a soap formed by the union of cottonseed oil and caustic potash has been found to bring effective results. However, other reagents may be used in the process within the scope of the invention, which, briefly, involves the use of a carrying body for the finely divided ore consisting of a saturated solution either of the ore itself, or of its soluble constituents, and the employment of an appropriate reagent, the nature of which may be varied in accordance with the particular character or condition of the material under treatment.

While I do not wish to be limited to any exact proportions, a pulp comprising approximately one part solid in four parts solution will be effective, the ore usually being ground to about 48 mesh for this purpose. From four to twenty pounds of reagent per ton of ore provides an effective range, and an operating interval of from five to ten minutes is preferred.

Since any of the well known apparatus for the concentration of ores by flotation, may be employed in the performance of the present process, it is thought unnecessary to submit drawings for the purpose of illustrating the various actions relied upon, to carry the process into practice.

What I claim and desire to secure by Letters Patent is:

1. The process of concenrating sylvinite ores containing potassium salts by flotation, comprising mixing the ore in a finely-divided condition, with a saturated solution of the ore, and subjecting the mixture to a froth flotation action, inclusive of the use of a frothing agent, formed by the union of cottonseed oil and caustic potash.

2. The process of treating sylvinite ores comprising the treatment of such ores in a saline solution having potassium chloride particles in undissolved form, preferentially filming such undissolved potassium chloride particles with a potassium-soap forming flotation reagent, and floating said filmed potassium chloride particles on the surface of the solution.

3. The process of treating sylvinite ores comprising the treatment of such ores in a saline solution having potassium chloride particles in undissolved form, preferentially filming such undissolved potassium chloride particles with a potassium-soap forming flotation reagent, and froth floating said filmed potassium chloride particles on the surface of the solution.

4. The process of treating sylvinite ores, comprising the treatment of such ores in a saline solution having potassium chloride particles in undissolved form, preferentially filming such undissolved potassium chloride particles with a flotation reagent capable of forming a potassium composition of soap-like character on the surface of such particles, and floating said particles so filmed on the surface of the solution.

5. The process of treating sylvinite ores comprising the treatment of such ores in a saline solution, having potassium chloride particles in undissolved form, and subjecting such undissolved potassium chloride particles to agitation in the presence of a potassium-soap forming reagent of the collector type having a selective affinity for the undissolved potassium chloride constituents.

6. The process of treating sylvinite ores comprising the treatment of such ores in a saline solution having potassium chloride particles in undissolved form, and subjecting such undissolved potassium chloride particles to aeration in the presence of a potassium-soap forming reagent of the collector type having a selective affinity for the undissolved potassium chloride constituents.

7. The process of treating sylvinite ores comprising the treatment of such ories in a saline solution having potassium chloride particles in undissolved form, and subjecting such undissolved potassium chloride particles to agitation and aeration in the presence of a potassium-soap forming reagent of the collector type having a selective affinity for the undissolved potassium chloride constituents of the ore.

LESLIE D. ANDERSON.